United States Patent [19]

Sager

[11] Patent Number: 4,618,516

[45] Date of Patent: Oct. 21, 1986

[54] ULTRASONIC WELDING OF THERMOPLASTIC WORKPIECES

[75] Inventor: Thomas B. Sager, Newtown, Conn.

[73] Assignee: Branson Ultrasonics Corporation, Danbury, Conn.

[21] Appl. No.: 775,343

[22] Filed: Sep. 12, 1985

[51] Int. Cl.[4] ............................................. B29C 65/08
[52] U.S. Cl. ..................................... 428/35; 156/73.1; 156/153; 264/23
[58] Field of Search .................. 156/73.1, 73.4, 580.1, 156/580.2, 73.5, 153; 264/23; 228/1.1, 110; 428/35

[56] References Cited

U.S. PATENT DOCUMENTS

| | | | |
|---|---|---|---|
| 3,819,437 | 6/1974 | Paine | 228/1.1 |
| 3,944,261 | 3/1976 | Reed et al. | 156/73.1 |
| 4,211,923 | 7/1980 | Fukuyama et al. | 156/73.1 |
| 4,564,932 | 1/1986 | Lange | 156/73.1 |

Primary Examiner—Michael Wityshyn
Attorney, Agent, or Firm—Philip J. Feig; Ervin B. Steinberg

[57] ABSTRACT

The method of joining two thermoplastic workpieces by ultrasonic energy along respective confronting surfaces includes providing one workpiece surface with an energy director while the opposing other workpiece surface contacted by the energy director exhibits a rough textured surface, rather than a conventional smooth surface, and an article manufactured according to such method.

4 Claims, 4 Drawing Figures

ULTRASONIC WELDING OF THERMOPLASTIC WORKPIECES

BRIEF SUMMARY OF THE INVENTION

This invention relates to the art of ultrasonic welding and, more specifically, refers to welding two rigid thermoplastic workpieces to one another along confronting surfaces.

Welding of thermoplastic workpieces by ultrasonic energy using frequencies in the range from sixteen kHz to sixty kHz is well established in the art. The process is usually accomplished by placing workpieces to be welded in stacked, juxtaposed relation, applying a compressive force between the workpieces and then applying ultrasonic energy to the workpieces by means of an ultrasonic horn, also known as resonator, tool, energy concentrator, sonotrode, etc. The dissipation of ultrasonic energy casues molten thermoplastic material at the interface between the workpieces. After a predetermined time interval, usually a fraction of a second, the ultrasonic energy is stopped for causing the molten thempoplastic material to solidify and thereby provide a fusion joint between the workpieces. In order to improve the welding process, the use of projections or ridges, also known as "energy directors", projecting from the surface of one workpiece and contacting the generally flat surface of the other workpiece has become well established. The use of energy directors and their configuration is amply disclosed in the following publications: "How to Get Good Ultrasonic Welds" by E. Obeda, Modern Plastics, November 1964; "Designing Plastic Parts For Ultrasonic Assembly", by D. Kolb, Machine Design, Mar. 16, 1967; "Joint Design for Ultrasonic Welding" Technical Information Sheet PW3 issued by Branson Sonic Power Company, Danbury, Conn. 06810; U.S. Pat. No. 3,661,661 issued to W. J. Berleyoung, dated May 9, 1972; U.S. Pat. No. 3,819,437 issued to E. Paine, dated June 25, 1974; U.S. Pat. No. 4,169,751 issued to E. Yen, data Oct. 2, 1979; "Ultrasonics in Packaging and Plastics Fabrication" (book) by R. Thomas, Cahners Publishing Co., Boston, Mass. 02110 (1974) pp. 104–108, and others.

The present invention concerns an improvement wherein the confronting surface contacted by the energy director is of a rough texture in order to increase the quality and ease with which a weld can be accomplished. Particularly, it has been found that when the normally smooth and flat thermoplastic surface confronting the energy director is of a rough texture, the power required to obtain softening and flowing of the thermoplastic material is greatly decreased while the strength of the weld is increased, typically by one hundred percent or more, as contrasted with the heretofore used weld technique.

An important object of this invention, therefore, is the provision of a new and improved arrangement for providing a weld between two thermoplastic workpieces.

Another important object of this invention is the provision of an arrangement for welding two thermoplastic workpieces to one another under conditions where the ultrasonic power required for welding is significantly descreased and improved weld strength is obtained.

Another important object of this invention is the provision of two thermoplastic workpieces to be welded to each other along confronting surfaces, one of the surfaces being provided with an energy director and the other surface being of a rough texture at the region where such surface is contacted by the energy director.

Further and still other important objects of this invention will be more clearly apparent by reference to the following description when taken in conjunction with the accompanying drawings.

DETAILED DESCRIPTION OF THE INVENTION

Figure 1:
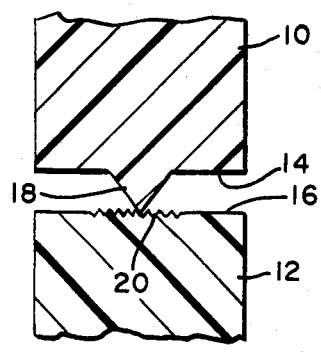
FIG. 1 is a sectional view of a typical joint configuration used for welding two thermoplastic workpieces to one another by ultrasonic energy.

Referring now to the figures, numeral 10 identifies a first thermoplastic workpiece which is in stacked, juxtaposed position with a second thermoplastic workpiece 12. The workpieces have confronting surfaces 14 and 16 respectively. The surface 14 is provided with an energy director 18 of triangular cross-section as shown in the prior art. Of course, energy directors of other cross-section also are useable. The apex of the triangle is in contact with the surface 16 for achieving a weld between the workpieces 10 and 12. The normally smooth surface 16, in the present invention, exhibits a rough texture 20 at the region contacted by the energy director. The roughened texture is achievable by molding, knurling, sandblasting, or other roughening techniques, and, generally, a finish simulating that of a coarse sandpaper is suitable. During welding the energy director softens incrementally from its front to its base and the softened and molten material flows and spreads along the open space while the workpieces close the gap between them. Also, the ultrasonic energy transferred from the energy director 18 upon the surface 16 causes a softening and melting of such surface. Ultimately, the both workpieces are seated upon one another along the mating surfaces 14 and 16 and upon the cessation of ultrasonic energy, the molten thermoplastic material at the interface surface rigidifies to provide a weld between both workpieces.

Figure 2:
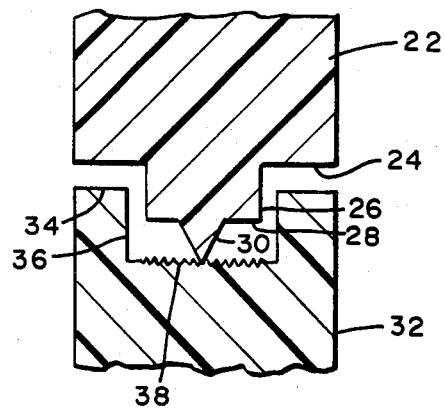
FIG. 2 is a sectional view of an alternative joint construction for welding thermoplastic workpieces.

FIG. 2 shows a different joint configuration. Workpiece 22 has three joint surfaces 24, 26 and 28. An energy director 30 extends from the surface 28. The workpiece 32 has three matching opposing surfaces 34, 36 and 38, the latter being made to exhibit a rough texture.

the advantage of the rough texture confronting the energy director resides in the fact that the apex portion of energy director under the influence of ultrasonic energy is prevented from slipping and sliding along the normally flat and smooth opposing surface. Therefore, the ultrasonic energy is dissipated faster and more efficiently. Also it appears that the shear forces are increased to provide a rapid dissipation of ultrasonic energy. As a result, welding is achieved with lower ultrasonic energy. In a typical example, the pull strength of the joint increased from 30 pounds to 80 pounds when the surface confronted by the energy director was roughened as contrasted with a smooth surface obtained from a standard mold surface.

Figure 3:
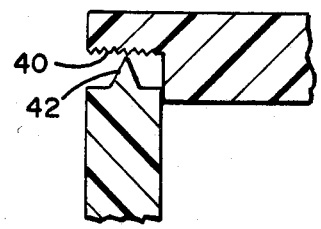
FIG. 3 is a sectional view showing another typical arrangement for welding two thermoplastic workpieces to one another.

FIG. 3 shows another typical joint configuration used for welding a thermoplastic cover to a container. Again, the surface 40 contacted by the energy director 42 is provided with a rough texture.

Figure 4:
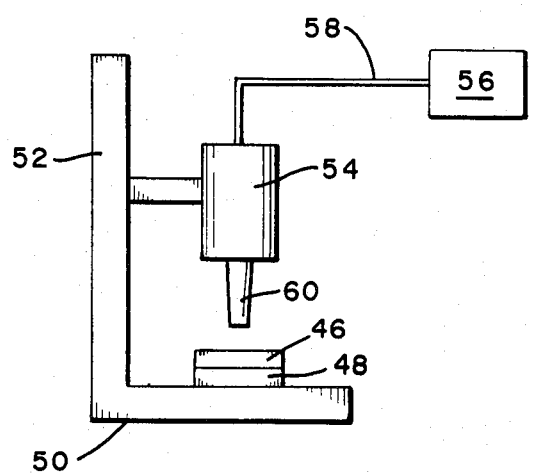
FIG. 4 is a schematic illustration depicting a typical ultrasonic welding apparatus and workpieces to be welded.

FIG. 4, for the sake of completeness, depicts a typical apparatus for welding workpieces. Two workpieces 46 and 48 are in stacked position disposed on a base 50 from which extends a vertical column 52. An electro-acoustic converter unit 54 is mounted for reciprocating vertical motion along column 52. The converter unit is coupled to receive electrical high frequency energy from a generator 56 via a cable 58. Responsive to the receipt of high frequency electrical energy, typically a frequency in the range from 16 kHz to 60 kHz, the converter unit provides mechanical high frequency vibrations to a horn 60 coupled to the converter unit. For achieving welding, the converter unit is lowered and the horn 60 is brought into forced contact with the workpiece 46. Subsequently, the generator 56 is energized for a fraction of a second to cause the transfer of ultrasonic energy to the workpieces to effect a flow of thermoplastic material at the joint between the workpieces 46 and 48. Then, for a brief dwell period the workpieces are retained under a compressive force by the horn while the ultrasonic energy is stopped, thereby permitting the softened thermoplastic material to rigidify for forming a weld. Subsequently the converter unit is raised along the column 52 and the workpieces, now welded, can be removed from the platform.

While there has been described and illustrated several preferred embodiments of this invention, it will be apparent to those skilled in the art that various changes and modifications may be made without deviating from the broad principle of this invention which shall be limited only by the scope of the appended claims.

What is claimed is:

1. The method of joining two thermoplastic workpieces by ultrasonic energy along respective confronting surfaces comprising the steps:
    providing the confronting surface of one of the workpieces with an energy director projecting from such surface;
    providing the confronting surface of the other workpiece with a rough texture;
    disposing the two workpieces for causing the energy director projecting from the confronting surface of said one workpiece to be in contact with the rough texture of the confronting surface of said other workpiece;
    applying a compressive force between said workpieces while providing ultrasonic energy to one of the workpieces;
    whereby responsive to the application of said compressive force and the application of ultrasonic energy the thermoplastic material forming said energy director and that of the surface of said other workpiece contacted by said energy director is softened and flows, and
    terminating the ultrasonic energy while retaining the compressive force during a dwell period for causing said softened thermoplastic material to solidify for effecting a weld between said workpieces.

2. The method of joining as set forth in claim 1, said energy director being a projection of substantially triangular cross-section, the apex of said triangular cross-section confronting said rough texture surface.

3. An article of manufacture formed by:
    positioning two thermoplastic workpieces in juxtaposed, stacked relationship with one another along confronting surfaces, one of said surfaces having an energy director extending from such surface for contacting the confronting surface of the other workpiece, the confronting surface of such other workpiece being of a rough texture;
    applying a compressive force to said workpieces for urging said confronting surfaces into contact with one another;
    applying ultrasonic vibratory energy to said workpieces to cause softening of the thermoplastic material of said energy director and the material on said other workpiece surface contacted by said energy director for providing molten thermoplastic material at the interface between said workpieces, and
    ceasing the application of ultrasonic energy while briefly maintaining said workpieces under a compressive force for causing said molten thermoplastic material to rigidify and form a weld.

4. An article of manufacutre as set forth in claim 3, said energy director being a projection of substantially triangular cross-section, the apex of said triangular cross-section confronting said rough texture surface.

* * * * *